(12) United States Patent
Agapiev

(10) Patent No.: US 7,716,205 B1
(45) Date of Patent: May 11, 2010

(54) SYSTEM FOR USER DRIVEN RANKING OF WEB PAGES

(75) Inventor: Borislav Agapiev, Portland, OR (US)

(73) Assignee: WOWD, Inc., Palo Alto, CA (US)

( * ) Notice: Subject to any disclaimer, the term of this patent is extended or adjusted under 35 U.S.C. 154(b) by 0 days.

(21) Appl. No.: 12/608,966

(22) Filed: Oct. 29, 2009

(51) Int. Cl.
G06F 7/00 (2006.01)

(52) U.S. Cl. .................. 707/707; 707/706; 707/722; 707/736; 707/713; 707/758; 707/781; 707/640; 707/610; 707/674; 370/328; 370/395.3; 370/395.72; 370/255; 370/252; 709/238

(58) Field of Classification Search ............... 707/706, 707/722, 736, 713, 758, 640, 610, 674; 370/328, 370/395.3, 395.72, 255, 252; 709/238
See application file for complete search history.

(56) References Cited

U.S. PATENT DOCUMENTS

| | | | |
|---|---|---|---|
| 6,421,675 B1 * | 7/2002 | Ryan et al. ...................... | 1/1 |
| 6,546,388 B1 * | 4/2003 | Edlund et al. ................... | 1/1 |
| 6,718,324 B2 | 4/2004 | Edlund et al. | |
| 7,444,358 B2 | 10/2008 | Paczkowski et al. | |
| 7,565,363 B2 | 7/2009 | Anwar | |
| 2002/0062323 A1 | 5/2002 | Takatori | |
| 2006/0064411 A1 | 3/2006 | Gross | |
| 2007/0033275 A1 | 2/2007 | Toivonen et al. | |
| 2007/0106659 A1 | 5/2007 | Lu et al. | |
| 2007/0244857 A1 | 10/2007 | Yu | |
| 2008/0154879 A1 | 6/2008 | Lin | |
| 2008/0256050 A1 | 10/2008 | Zhang | |
| 2009/0030876 A1 | 1/2009 | Hamilton | |
| 2009/0182834 A1 * | 7/2009 | Zettler et al. ................. | 709/208 |
| 2009/0193007 A1 | 7/2009 | Mastalli | |
| 2009/0252071 A1 * | 10/2009 | Nurminen et al. ........... | 370/311 |

(Continued)

FOREIGN PATENT DOCUMENTS

WO 2001016807 A1 3/2001

OTHER PUBLICATIONS

Title: Koorde: A simple degree-optional distributed hash table Author: Kasshoek et al. Date: 2003 Publisher: IRIS Project Http://project-iris.net Pertinent pp. 6.*

(Continued)

*Primary Examiner*—Khanh B. Pham
*Assistant Examiner*—Syling Yen
(74) *Attorney, Agent, or Firm*—Sonnenchein Nath & Rosenthal LLP

(57) ABSTRACT

Linked documents are ranked by observing link selections for referred documents from referring documents and counting such selections. The counts for each of the link selections are stored at various computer systems of a distributed network, a centralized collection of computers connected through a local network, or a hybrid system (collectively, the "system") consisting of combinations of distributed and centralized systems, and processed (e.g., using a discrete probability distribution defined by the counts of the link selections) to obtain page ranks for the referred documents. The link selections may be observed by a browser extension running on individual ones of the computer systems of the distributed network and the counts of the link selections may be stored at locations within the system determined by a distributed hash table. Search request results may be displayed in a ranked order as determined by the page ranks.

4 Claims, 2 Drawing Sheets

U.S. PATENT DOCUMENTS

2010/0010987 A1* 1/2010 Smyth et al. .................. 707/5

OTHER PUBLICATIONS

Benjamin Piwowarski, Predictive user click models based on click-through history, Conference on Information and Knowledge Management archive, Proceedings of the sixteenth ACM conference on Conference on information and knowledge management, SESSION: Web retrieval I (IR), Lisbon, Portugal, pp. 175-182, 2007, ACM New York, NY, USA.

Taly Sharon, Henry Lieberman & Ted Selker, A zero-input interface for leveraging group experience in web browsing, International Conference on Intelligent User Interfaces archive, Proceedings of the 8th international conference on Intelligent user interfaces, Miami, Florida, USA, Poster Session, pp. 290-292, 2003.

Wang, Q. & Yiu-Kai, NG, An ontology-based binary-categorization approach for recognizing multiple-record Web documents using a probabilistic retrieval model, Information Retrieval, vol. 6, No. 3-4, p. 295-332, Sep.-Dec. 2003, Kluwer Academic Publishers, USA.

Abhishek Kumar; Shashidhar Merugu; Jun (Jim) Xu; Xingxing Yu, Ulysses: A Robust, Low-Diameter, Low-Latency Peer-to-Peer Network, Proceedings of the 11th IEEE International Conference on Network Protocols, p. 258, 2003.

* cited by examiner

SYSTEM FOR USER DRIVEN RANKING OF WEB PAGES

FIELD OF THE INVENTION

The present invention generally relates to the analysis of links between World Wide Web (Web) pages and the use of data concerning user actions to calculate numerical rankings of the pages.

BACKGROUND

PageRank™ is currently the most widely deployed and influential algorithm for the ranking of Web pages and is the basis for the Internet search engine used by Google™. More particularly, and as described in U.S. Pat. No. 6,285,999, PageRank is a link analysis algorithm that assigns numerical weights to each element of a set of hyperlinked documents (e.g., Web pages) in order to measure each document's relative importance within the set of documents. The assigned weight is called the PageRank of a document D, and is denoted PR(D).

Ranking is essential in determining which links should be displayed in what order as results responsive to user queries submitted via search engines. PageRank is one of the key values determining the order in which the result links should be displayed by computing a numerical value for each Web page. Other factors also influence relative order of results returned in response to a query, including the appearance of query keywords in the title of a Web page, headings, frequency of occurrences in the Web page, keyword appearances in the anchor text of the links on pages pointing to a given page, and other factors. The result links are then presented in a list in order of descending PageRank value.

PageRank, PR, of a Web page, $pg_i$, is defined as follows:

$$PR(pg_i) = \frac{1-d}{N} + d \sum_j \frac{PR(pg_j)}{L(pg_j)}$$

Pages $pg_j$ denote Web pages pointing to page $pg_i$, in other words pages containing links to page $pg_i$. N is the total number of Web pages and d is a damping factor, which for PageRank is the probability that a random surfer will continue clicking on links on Web pages.

It can be shown that PageRank can be viewed as the probability that a random surfer will land on a particular page by following links on Web pages and choosing a link on a current page at random. Such random surfer can be modeled as a Markov chain or Markov process. A random surfer can land on pages with no outgoing links, in which case the surfing cannot continue, or get stuck in a set of Web pages that form a cycle. In order to avoid such situations, at every step the random surfer can choose to jump on a random Web page with probability 1-d, where d is the damping factor, instead of following links. The random jumping and the damping factor are required to ensure the convergence of the process of computation of PageRank values.

SUMMARY OF THE INVENTION

In accordance with embodiments of the present invention, linked documents are ranked by observing link selections for referred documents from referring documents and counting such selections. The counts for each of the link selections are stored at various computer systems, including but not limited to a distributed network, an individual computer, a centralized network of computers connected through a local network, or a hybrid system consisting of combinations of the foregoing, and processed (e.g., using a discrete probability distribution defined by the counts of the link selections) to obtain page ranks for the referred documents. The link selections may be observed by a browser extension running on individual ones of the computer systems of the distributed network. In one embodiment of the invention, counts of the link selections may be stored at locations within a distributed network determined by a distributed hash table or another such arrangement of nodes in a network with a logarithmic network diameter where the time to find any node is a logarithmic function of the size of the network. In other embodiments, counts of the linked sections may be stored on a centralized system that includes a collection of computers connected through a local network or a hybrid system comprised of a combination of distributed and centralized systems. Search request results may be displayed in a ranked order as determined by the page ranks.

These and further embodiments and features of the present invention are discussed below.

BRIEF DESCRIPTION OF THE DRAWINGS

The present invention is illustrated by way of example, and not limitation, in the figures of the accompanying drawings, in which.

DETAILED DESCRIPTION

Figure 1:
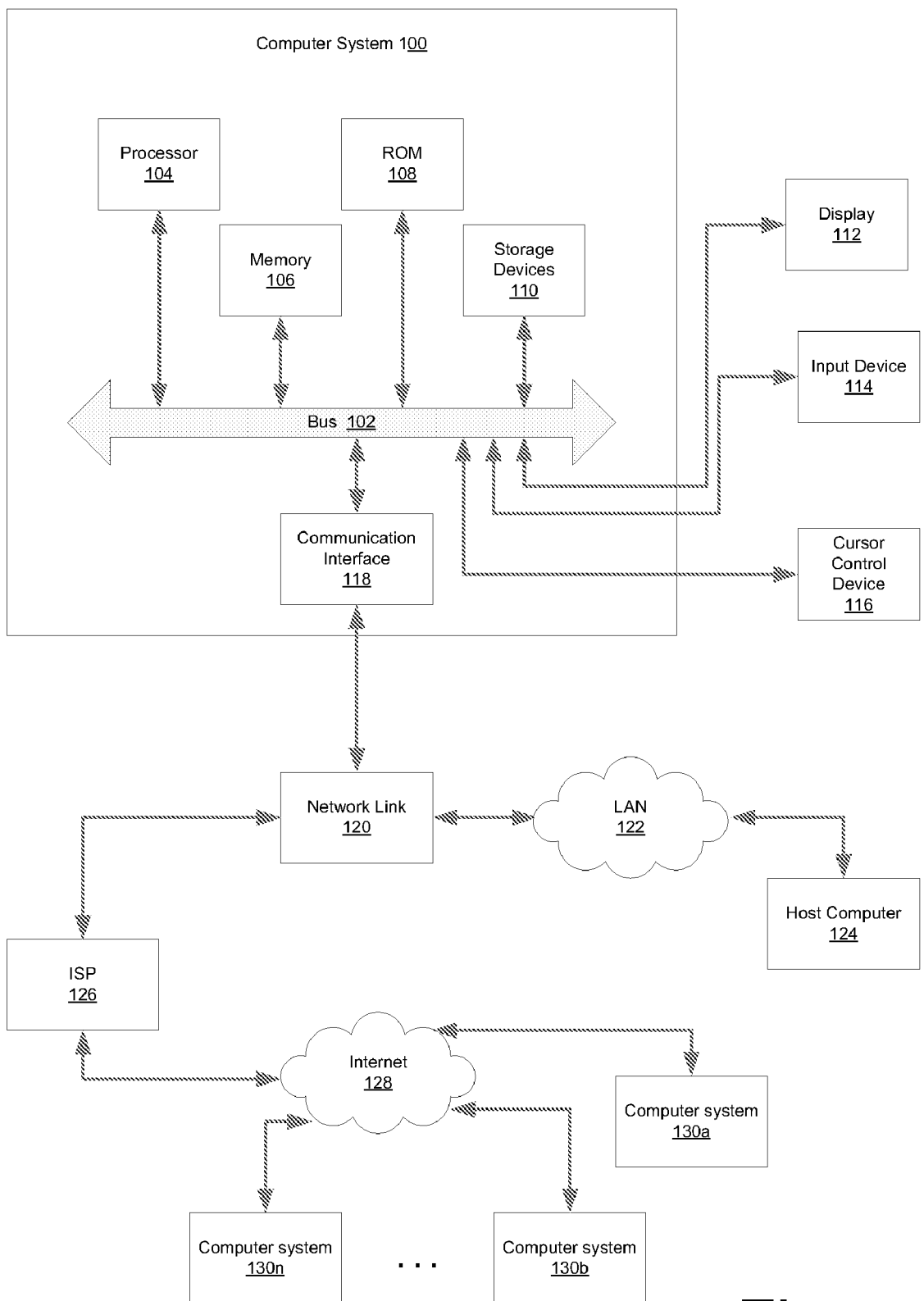
FIG. 1 illustrates an example of a computer system which may store and execute a computer-implemented process for monitoring user selections of links on a Web page in accordance with an embodiment of the present invention.

While useful, the random surfer model for page ranking ignores the reality that not all Web pages are equal. That is, some Web pages are clearly more popular than others. Hence, links associated with such pages are more likely to be traversed by actual Web surfers and, accordingly, should be accorded more weight than links which are unlikely to be selected by Web surfers. Accordingly, the present inventor has developed a new procedure for ranking Web pages which takes into account the actions of an actual Web surfer. The process and system implementing same are described below.

In the definition of PageRank, the coefficient $1/L(pg_j)$, which is multiplied by $PR(pg_j)$ in computing the rank value of a particular page, can be viewed as the probability that a random surfer will select (e.g., click on) a particular link on page $pg_j$. The same value, $1/L(pg_j)$, is used in computing PageRank values for all pages to which page pg, points. Because the same value is used for outgoing links to pages, the random surfer model of PageRank assumes that all outgoing links have equal probability of being followed. In other words, a random surfer will click on a link on a particular page with equal probability.

The present invention, however, recognizes that the probabilities of following links on a particular page pg, do riot have to be equal. Accordingly, in computing rank values, we replace the single coefficient 1/L(pg$_j$), which is constant for pg$_j$, with a set of probabilities p$_{ij}$. Probability p$_{ij}$ is the probability that a surfer will click the link to the page p$_i$ on the page p$_j$. Thus, in accordance with the present invention, the rank a Web page is computed as follows:

$$PR(pg_i) = \frac{1-d}{N} + d \sum_j PR(pg_j) P_{ij}.$$

The set of probabilities p$_{ij}$ for a given page, pg$_j$, represent a discrete probability distribution satisfying the following constraints:

$$0 \leq p_{ij} \leq 1, \sum_j p_{ij} = 1.$$

In order to determine probabilities p$_{ij}$, we keep track of actual Web surfer behavior by monitoring user selection of links on a page and counting same. This is done, in one embodiment of the invention, using a browser extension or other application installed on an individual user's computer system. When a user loads a Web page in the browser, the identity of the page is recorded (e.g., using the uniform resource locator (URL) of the page, or some other identifier) and when a user selects a link on the page a counter associated with that link is incremented. In one embodiment of the invention, the counter is implemented in a distributed network organized as a distributed hash table. In other instances, the counters can be stored in a centralized system of computers connected through a local network or a hybrid combination of distributed and centralized systems.

For every page pg$_j$ then, there is a set of counters, one each for each link on that page. Every time an user selects a link to page pg$_i$ on pg$_j$, the corresponding counter is incremented. Now, if we let v$_{ij}$ be the value for the counter for the link to page pg$_i$ on page pg$_j$, and V$_j$ be the sum of all v$_{ij}$ on page pg$_j$, i.e., the sum of all selections of all links on page pg$_j$:

$$V_j = \sum_j v_{ij}$$

Thus, we define probabilities p$_{ij}$ as:

$$p_{ij} = v_{ij} / \sum_j v_{ij} = v_{ij} / V_j.$$

Note that p$_{ij}$ forms a discrete probability distribution by definition:

$$\sum_i p_{ij} = \sum_i v_{ij} / V_j = 1$$

and $$0 \leq v_{ij} \leq V_j,$$

$$0 \leq p_{ij} = v_{ij}/V_j \leq 1$$

As noted, the probabilities p$_{ij}$ are intended to measure actual probabilities of users following links on pages, as determined by actual link selections from a set of users, instead of assuming an uniform probability. In one embodiment of the present invention, the links selections are counted by a computer-implemented process running on a user's computer system. An example of such a computer system is shown in FIG. 1.

Computer system 100, upon which the link selection monitoring software may be installed, includes a bus 102 or other communication mechanism for communicating information, and a processor 104 coupled with the bus 102 for processing information. Computer system 100 also includes a main memory 106, such as a RAM or other dynamic storage device, coupled to the bus 102 for storing information and instructions (such as instructions comprising the link selection monitoring software when the program is running) to be executed by processor 104. Main memory 106 also may be used for storing temporary variables or other intermediate information during execution of instructions to be executed by processor 104. Computer system 100 further includes a ROM 108 or other static storage device coupled to the bus 102 for storing static information and instructions for the processor 104. A storage device 110, such as a hard disk, is provided and coupled to the bus 102 for storing information and instructions (such as instructions comprising the link selection monitoring software).

Computer system 100 may be coupled via the bus 102 to a display 112 for displaying information to a computer user. An input device 114, including alphanumeric and other keys, is coupled to the bus 102 for communicating information and command selections to the processor 104. Another type of user input device is cursor control device 116, such as a mouse, a trackball, or cursor direction keys for communicating direction information and command selections to processor 304 and for controlling cursor movement on the display 112.

Computer system 100 also includes a communication interface 118 coupled to the bus 102. Communication interface 108 provides for two-way, wired and/or wireless data communication to/from computer system 100, for example, via a local area network (LAN). Communication interface 118 sends and receives electrical, electromagnetic or optical signals which carry digital data streams representing various types of information. For example, two or more computer systems 100 may be networked together in a conventional manner with each using a respective communication interface 118.

Network link 120 typically provides data communication through one or more networks to other data devices. For example, network link 120 may provide a connection through LAN 122 to a host computer 124 or to data equipment operated by an Internet service provider (ISP) 126. ISP 126 in turn provides data communication services through the Internet 128, which, in turn, may provide connectivity to multiple remote computer systems 130a-130n (any or all of which may be similar to computer system 100. LAN 122 and Internet 128 both use electrical, electromagnetic or optical signals which carry digital data streams. Computer system 100 can send messages and receive data through the network(s), network link 120 and communication interface 118.

Figure 2:
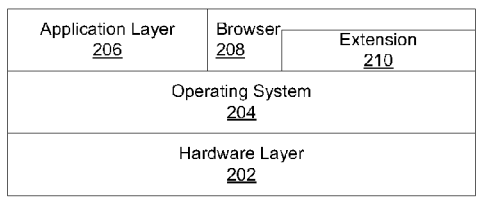
FIG. 2 illustrates an architectural view of the computer system shown in FIG. 1.

FIG. 2 illustrates the same computer system 100, this time from an architectural standpoint. In this simplified representation, the computer system includes a hardware layer 202, which is abstracted by an operating system 204. Any conventional operating system may be used. The operating system may be stored in storage device 110 and read into memory 106 when executing. Running on top of the operating system are the programs which make up the application layer 206, including a Web browser 208. As shown, the link monitoring software can be implemented in form of a browser extension or plug-in 210, or in other cases may be a separate program in application layer 206. Browser plug-ins and extensions are computer implemented processes integrated into a browser environment and which are capable of performing miscellaneous actions in response to user actions within the browser.

Figure 3:
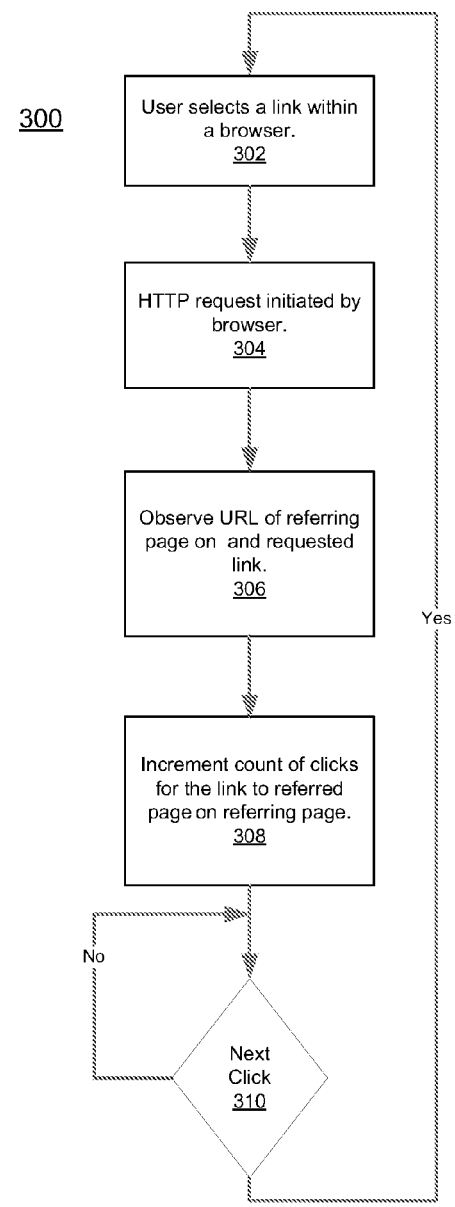
FIG. 3 illustrates an example of a process for counting link selections from referring pages in accordance with an embodiment of the present invention.

FIG. 3 illustrates a process 300 that highlights the operations of the link selection monitoring software. Every time an user clicks on a link within a browser (302), an HTTP request is initiated by the browser (304). The request includes the URL of the page which is being requested (the requested page), i.e., the URL of the link on which the user clicked. In addition, it includes the URL of the page which the user was looking at (the requesting page) and on which the requested link exists. The URL of the requesting page is specified in the "Referer" field of the HTTP request initiated by the browser. In other words, a request for the link to page $pg_i$ on page $pg_j$ will have the HTTP Referer field of the header set to the URL of page pg, and the requested URL will be the URL of page $pg_i$.

In accordance with the present invention, such a request causes an increase in the count of selections for the link to page $pg_i$ on page $pg_j$ (308). This process repeats for each link selection from each page being browsed by the user (310). That is, the browser extension software on the user's computer system observes the user's link selections and initiates actions for updates of counts of such selections on the referer pages.

Figure 4:
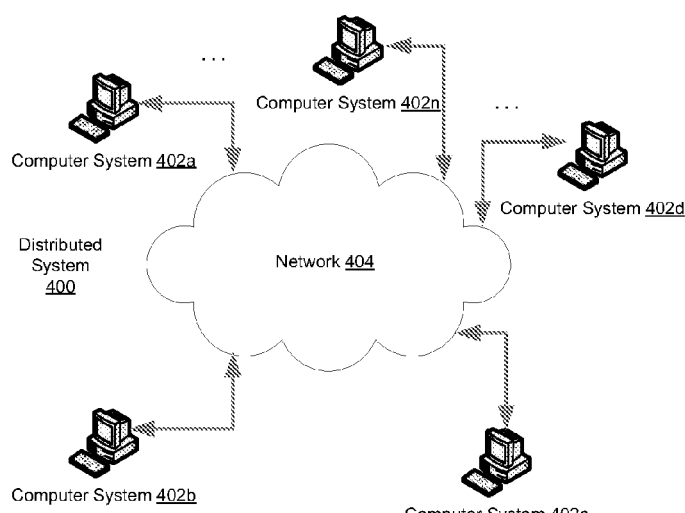
FIG. 4 illustrates an example of a distributed system within which embodiments of the present invention may be implemented

Preferably, and in accordance with an embodiment of the present invention, the counters of link selections $v_{ij}$ are distributed in a peer-to-peer network, comprising a distributed file system. Such a system 400, is illustrated in FIG. 4. Each computer 402a-402n is communicatively coupled via one or more networks 404 (such as the Internet) and can be responsible for handling counters for a set of pages. The name space of URLs for all pages is divided among computers 402a-402n using a distributed hash table (DHT) and each respective counter for a given URL is stored at a location determined by the DHT. In other instances, the counters of link selections can be stored in a centralized system of computers connected through a local network or a hybrid combination of distributed and centralized systems. For example, the counts of the link selections may be stored at locations determined by arrangement of nodes in a network with a logarithmic network diameter where the time to find any node in the network is a logarithmic function of a size of the network.

A hash table is a function that uniformly and, often uniquely, maps strings to a range of numbers. The number to which a hash function maps a given string is called the key for that string. A DHT then is a means for partitioning the space of all possible keys among a set of computers connected through a network.

One or more of the computer systems 402a-402n may be configured with the link selection monitoring software and each may be configured to perform the data storage and synchronization processes associated with the DHT-based distributed file system (DHTFS), for example through the use of appropriately coded computer-readable instructions stored on computer-readable media and executed by computer processors associated with each computer system. The DHTFS stores content across the address space defined by the storage devices of computer systems 402a-402n using the DHT keys as partitions for that address space. In practice, the number of individual computer systems that make up distributed system 400 may be very large.

In accordance with the present invention then, the file system used by distributed system 400 relies on the mappings provided by a DHT to partition the storage of content items within the distributed system so that content items (the count values for the link selections observed by the link selection monitoring software) are stored at individual ones of computer systems 402a-402n, but are accessible to all such computer systems. The storage and retrieval of content items are facilitated through two principal kinds of messages:

DHT.put(key,value)
DHT.get(key)

The DHT put message is used for storing an arbitrary sequence of bytes value under the key key. The DHT gel message returns the last value stored in the DHT under a given key. Thus, each increase in count for a counter $v_{ij}$ can be encoded as a DHT put request to the hash corresponding to the URL of page $p_j$. For instance, such a DHT put could be encoded as DHT.put(hash(IRL($pg_j$)),"INC(URL($pg_i$),1")

The second argument encodes a message to increment the counter for $pg_i$. This increment request is automatically routed by the DHT to the computer responsible for handling counters for page $pg_j$. Creation of replicas of the stored data and synchronization among them is handled by the underlying distributed file system as more fully discussed in a co-pending U.S. patent application Ser. No. 12/608,932 entitled, "DHT-BASED DISTRIBUTED FILE SYSTEM FOR SIMULTANEOUS USE BY MILLIONS OF FREQUENTLY DISCONNECTED, WORLD-WIDE USERS", filed on even date herewith, assigned to the assignee of the present invention and incorporated herein by reference in its entirety.

In one embodiment of the invention, the computers in the distributed network compute rank values of all pages by performing a distributed computation and communicating values of probabilities $p_{ij}$ as well as values for intermediate computations. In another embodiment, the individual computers monitoring HTTP requests send information about the observed link selections to a common server, a collection of servers connected through a local network, or a hybrid system consisting of a combination of distributed and centralized systems. The server, or servers, use information received from the individual computers to compute probabilities $p_{ij}$ and compute the rank values as described above. In response to a search request, the rank of each page associated with a result for the request can be read (e.g., using a gel operation) and the URLs for such pages listed in an order determined by such ranks. Such organization may be accomplished at each browser, or at a central server or servers before the results are passed to an individual computer system's browser.

As should be apparent from the foregoing discussion, various embodiments of the present invention may be implemented with the aid of computer-implemented processes or methods (i.e., computer programs or routines) or on any programmable or dedicated hardware implementing digital logic. Such processes may be rendered in any computer language including, without limitation, a object oriented programming language, assembly language, markup languages, and the like, as well as object-oriented environments such as the Common Object Request Broker Architecture (CORBA), Java™ and the like, or on any programmable logic hardware like CPLD, FPGA and the like.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments of the present invention can be implemented with apparatus to perform the operations described herein. Such apparatus may be specially constructed for the required purposes, or may be appropriately programmed, or selectively activated or reconfigured by a computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

Thus, methods and systems for determining user-driven page rankings of Web pages have been described. Although discussed with reference to certain examples, the present invention should not be limited thereby. Instead, the invention should be measured only in terms of the claims, which follow.

What is claimed is:

1. A method for ranking Web pages, comprising:

tracking actual Web surfer behavior at one or more computer systems of a distributed system through monitoring and counting of user selections of links on Web pages;

storing counts of the user selections at nodes of the distributed system, said nodes defining a peer-to-peer network wherein a name space of uniform resource locators (URLs) for Web pages is divided among the nodes of the distributed system according to keys of a distributed hash table (DHT) and each respective count for a given one of the URLs is stored at a location determined by the DHT; and assigning a page rank (PR) to each of the Web pages according to each Web page's respective count, wherein the page ranks are determined according to a discrete probability distribution defined by the counts of the selections of the links as follows:

$$PR(pg_i) = \frac{1-d}{N} + d\sum_j PR(pg_j)P_{ij}$$

where pages $pg_j$ denote Web pages pointing to page $pg_j$, N is a total number of Web pages, d is a damping factor, and probability $p_{ij}$ is a probability that a Web surfer will select a link to a page $p_j$ on the page $p_j$.

2. The method of claim 1, wherein the monitoring is performed by respective browser extensions executing at the one or more computer systems.

3. The method of claim 1, wherein the monitoring comprises, at each respective computer system and in response to a browser executing on the respective computer system loading a respective one of the Web pages, recording an identity of the respective Web page loaded by the respective browser, and, responsive to user selection of a link on the respective Web page, incrementing a respective one of the counts associated with that link.

4. The method of claim 1, wherein in response to a search request, a rank of each Web page associated with a result for the search request is read and respective URLs for Web pages satisfying the search request are returned and listed in an order determined by said ranks.

* * * * *

UNITED STATES PATENT AND TRADEMARK OFFICE
CERTIFICATE OF CORRECTION

| | | |
|---|---|---|
| PATENT NO. | : 7,716,205 B1 | Page 1 of 1 |
| APPLICATION NO. | : 12/608966 | |
| DATED | : May 11, 2010 | |
| INVENTOR(S) | : Borislav Agapiev | |

It is certified that error appears in the above-identified patent and that said Letters Patent is hereby corrected as shown below:

<u>Col 8, Claim 1, line 29-32: in both instances noted below in brackets and underlining, the sub- "j" should be sub-"i":</u>

1.    A method for ranking Web pages, comprising:
    tracking actual Web surfer behavior at one or more computer systems of a distributed system through monitoring and counting of user selections of links of Web pages;
    storing counts of the user selections at nodes of the distributed system, said nodes defining a peer-to-peer network wherein a name space of uniform resource locators (URLs) for Web pages is divided among the nodes of the distributed system according to keys of a distributed hash table (DHT) and each respective count for a given one of the URLs is stored at a location determined by the DHT; and
    assigning a page rank (PR) to each of the Web pages according to each Web page's respective count, wherein the page ranks are determined according to a discrete probability distribution defined by the counts of the selections of the links as follows:

$$PR(pg_i) = \frac{1-d}{N} + d\sum_j PR(pg_j)p_{ij}$$

where pages pg, denote Web pages pointing to page [[$p_j$]] <u>$pg_i$</u>, N is a total number of Web pages, d is a damping factor, and probability $p_{ij}$ is a probability that a Web surfer will select a link to a page [[$p_j$]] <u>$p_i$</u> on the page $p_j$.

Signed and Sealed this
Twentieth Day of December, 2011

David J. Kappos
*Director of the United States Patent and Trademark Office*